(12) United States Patent
McLemore (10) Patent No.: US 7,298,312 B2
(45) Date of Patent: Nov. 20, 2007

(54) DETECTING SMALL, TIME DOMAIN IMPULSIVE COMMUNICATIONS SIGNALS

(75) Inventor: Donald P. McLemore, Albuquerque, NM (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 138 days.

(21) Appl. No.: 11/166,207

(22) Filed: Jun. 27, 2005

(65) Prior Publication Data

US 2006/0290563 A1    Dec. 28, 2006

(51) Int. Cl.
*G01S 13/78* (2006.01)
*H04B 1/00* (2006.01)

(52) U.S. Cl. .......................... 342/45; 375/130
(58) Field of Classification Search ........... 342/45; 375/346, 130
See application file for complete search history.

(56) References Cited

U.S. PATENT DOCUMENTS

| | | | |
|---|---|---|---|
| 6,031,862 A | 2/2000 | Fullerton et al. | |
| 6,529,568 B1 * | 3/2003 | Richards et al. | 375/346 |
| 6,700,939 B1 * | 3/2004 | McCorkle et al. | 375/295 |
| 6,762,712 B2 * | 7/2004 | Kim | 342/135 |
| 6,806,821 B2 * | 10/2004 | McLemore | 342/22 |
| 6,920,194 B2 * | 7/2005 | Stopler et al. | 375/349 |
| 6,970,496 B1 * | 11/2005 | Ben-Bassat et al. | 375/141 |
| 2003/0161411 A1 * | 8/2003 | McCorkle et al. | 375/295 |
| 2005/0128131 A1 * | 6/2005 | Rosenberg et al. | 342/45 |
| 2006/0140249 A1 * | 6/2006 | Kohno | 375/130 |

\* cited by examiner

*Primary Examiner*—Thomas H. Tarcza
*Assistant Examiner*—Harry Liu
(74) *Attorney, Agent, or Firm*—Buchanan Ingersoll & Rooney PC (57) ABSTRACT

A method and system are disclosed for generating and detecting secure UWB or relatively small time domain impulsive communications signals. A transmitter generates a sequence of at least three pulses having a predetermined template, and the pulses are generated in a predetermined sequence anywhere within a series of predetermined time intervals. A receiver detects the sequence of pulses within the predetermined intervals by convolving the predetermined template with the received signal. The information represented by the detected pulses is preferably used for secure communications.

6 Claims, 9 Drawing Sheets

DETECTING SMALL, TIME DOMAIN IMPULSIVE COMMUNICATIONS SIGNALS

FIELD OF THE INVENTION

The present invention relates to a method and apparatus for generating and detecting time domain impulsive communications signals having a sequence of at least three pulses anywhere within predetermined time intervals, and it more specifically relates to a secure communications system which is well adapted for use in a ground-to-ground communications system, an air-to-ground communications system or an identification of friend or foe ("IFF") system.

DESCRIPTION OF THE RELATED ART

Time domain impulsive signal technology, or what is sometimes called UWB technology, has been around for several decades. In the past, this technology has been used primarily for radar-based applications. Developments in high-speed switching technology, however, are making UWB technology more attractive for low-cost consumer communications applications. Many companies are currently working on R&D projects that explore the possibility of extending UWB technology into the high-rate communications arena, and the FCC is setting emissions limits that would permit deployment of UWB communications systems on an unlicensed basis.

BACKGROUND OF THE INVENTION

An UWB radio is an RF communications device that uses high-bandwidth microwave pulses for transmitting digital data over a wide spectrum of frequency bands using very low power intensity. These devices can transmit data at very high rates (for wireless local area network applications) and very low rates (for telemetry applications). Within the power limit allowed under the current FCC regulations, UWB radios can carry large amounts of data over a short distance, at very low power. An UWB radio has the ability to carry signals through doors and other obstacles that tend to reflect signals at more limited bandwidths and at higher power levels. If higher power levels are used, UWB signals can travel significantly greater ranges.

UWB radio broadcasts use digital pulses timed very precisely. UWB radios do not use sine waves. The transmitter and receiver are highly synchronized, and they send and receive pulses with an accuracy of trillionths of a second. UWB technology is used in very high-resolution radars and precision (sub-centimeter) radio location systems.

Since UWB transmissions are high speed pulses instead of sine waves, UWB transmissions have a high degree of immunity to multipath fading. The constructive and destructive interference created by multiple reflections of the same sine wave signal being received simultaneously is known as multipath fading. This immunity to multipath fading makes UWB technology well suited for applications in environments that would otherwise suffer from multipath fading associated with sine wave transmissions.

UWB devices use the same increasingly crowded radio frequencies that many other systems use. UWB devices typically send out short electromagnetic pulses of half a billionth of a second, and the pulses are followed by pauses that of approximately 200 times that length. By spreading the pulses over a wide area of the spectrum (roughly 1 GHz), UWB devices use extremely low power and wide total bandwidths. UWB technology proponents envision applications such as home security and personal-area networks that activate home appliances. Police and fire departments are currently testing UWB devices that can detect people behind walls.

The government and private industry have an increasing interest in UWB technology. Two main UWB applications of interest include the transmission of large volumes of voice and data at very high speeds with relatively little power, and wall penetrating radars that provide detailed images of objects behind a wall. One of companies actively developing UWB applications is Time Domain Corporation. A representative example of Time Domain's technology is described in U.S. Pat. No. 6,031,862, by Fullerton et al, entitled "Ultrawide-Band Communication System and Method". The voice and data applications, developed by Time Domain Corporation and others, have been primarily directed to increasing the transmission speed and volume of data, and the possibilities for using UWB transmissions for secure communications have not been fully exploited.

Accordingly, the present invention is directed to a method and apparatus for generating and detecting UWB or time domain impulsive communications signals which are useful in different types of secure communications systems.

SUMMARY OF THE INVENTION

The present invention provides time domain impulsive communications signals for use in a secure communications system. Relatively small, time domain impulsive signals are transmitted and received between first and second locations. The transmitter located at a first location generates a sequence of at least three pulses having a predetermined template, and the pulses are generated anywhere within a series of predetermined time intervals. The predetermined time intervals have established beginning times, and the pulses within each time interval have a known predetermined relationship with each other. A receiver at a second location detects the sequence of pulses within the predetermined intervals by convolving the predetermined template with the received signal. The information represented by the pulses is preferably used for secure communications. The method and system of the present invention are particularly well suited for transmission of secure ground-to-ground messages, secure aircraft-to-ground messages, or IFF data.

DETAILED DESCRIPTION OF THE INVENTION

Figure 1:
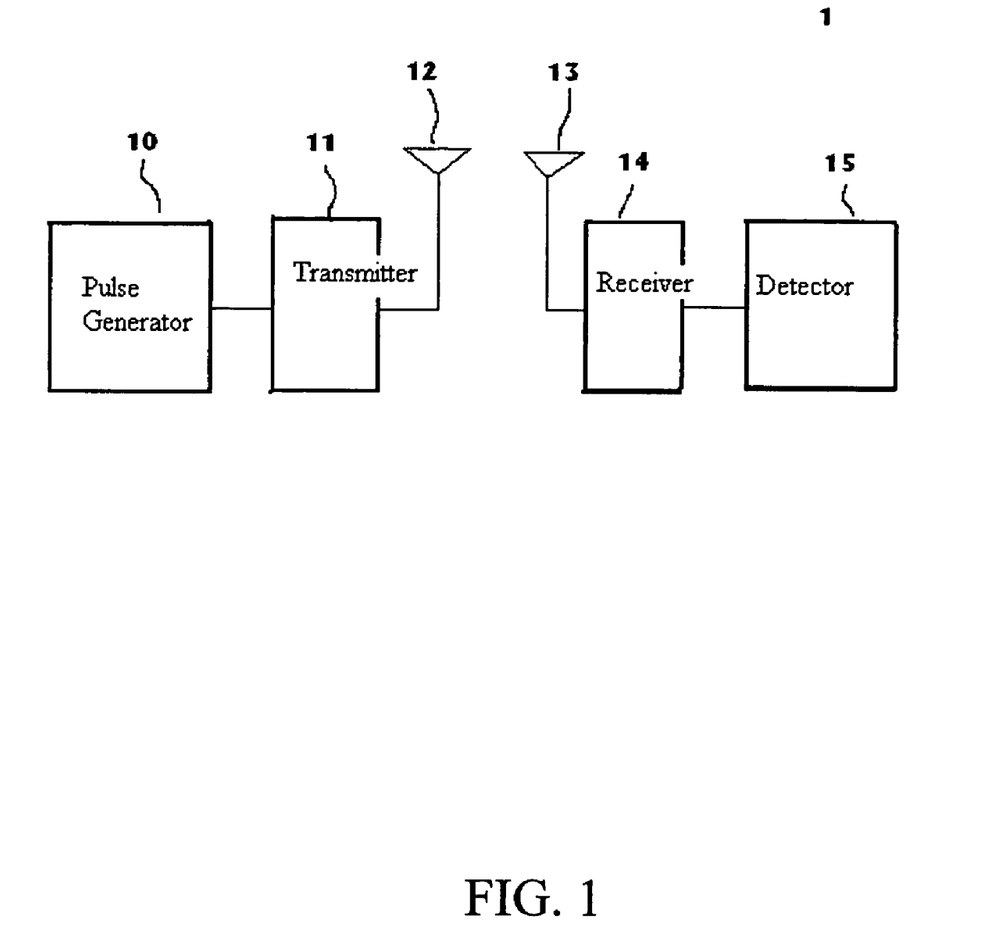
FIG. 1 is a block diagram of an exemplary system that utilizes the method and apparatus of the present invention.

Referring now to FIG. 1, a block diagram depicting an exemplary system may represent a ground-to-ground communication system, an IFF system, or a ground-to-air communication system that utilizes the method and apparatus of the present invention. The system 1 depicted in FIG. 1 is useful for land based military forces that need a secure communications link. The system may comprise a pulse generator 10 generating a sequence of pulses, a transmitter 11 transmitting the sequence of pulses, antennas 12 and 13, a receiver 14 receiving the sequence of pulses, and a detector 15 detecting the presence of predetermined pulses. Such a system 1 preferably utilizes directional antennas to minimize an enemy's ability to intercept the communications. An exemplary directional antenna 200 having a support structure 202 is shown in FIG. 2.

Figure 2:
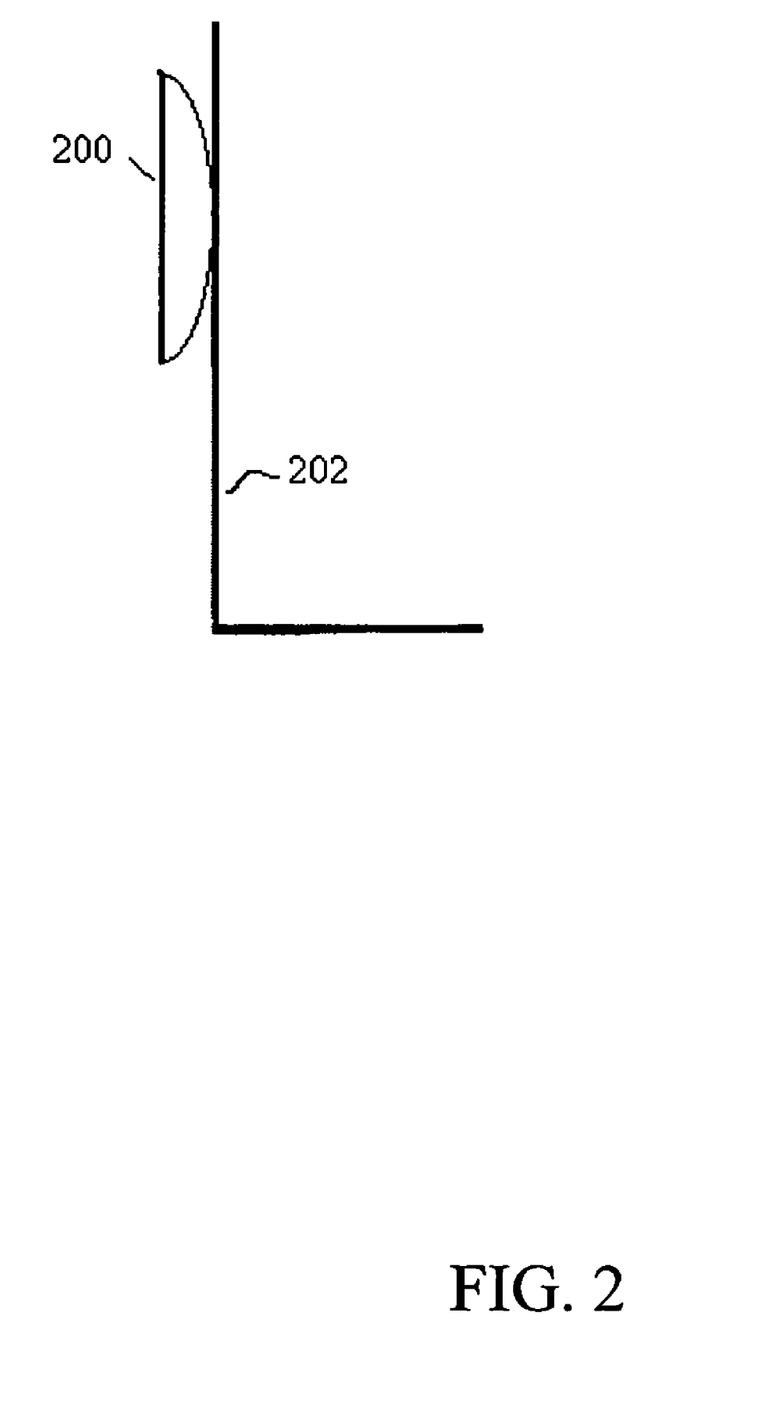
FIG. 2 is a conceptual diagram of an exemplary directional antenna for the exemplary system that utilizes the method and apparatus of the present invention.

It can be appreciated from the exemplary system depicted in FIGS. 1 and 2, that a directional antenna is extremely useful for limiting an enemy's ability to intercept a signal utilizing the apparatus and method of the present invention. In addition to the fact that directional antennas can be used to enhance secure communications and control, the broadband aspect of the impulsive signal also serves to disguise it from casual detection. Furthermore, previously knowing the time characteristic of the impulsive transmission and the exact time sequence for a train of pulses increases the detection capabilities for the receiver of the communications signal. An example will serve to illustrate this point.

Figure 3:
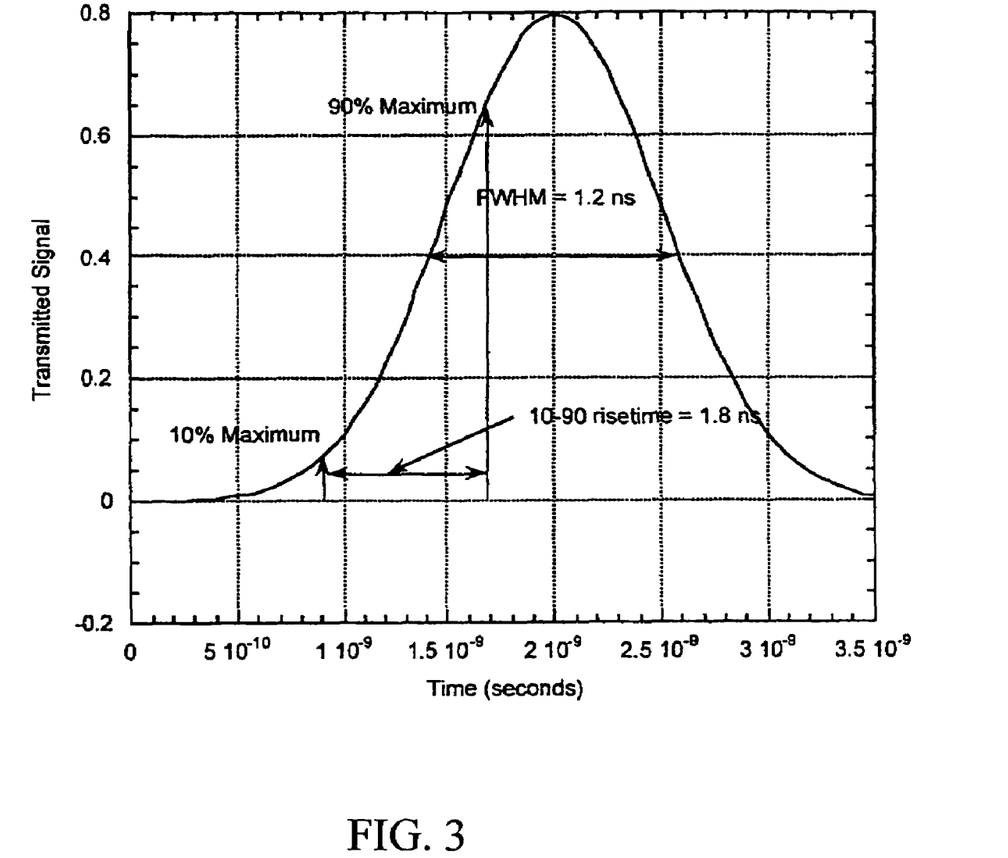
FIG. 3 is a waveform diagram of a single pulse in an UWB communications signal.

In order to explain the principles of the present invention, a basic transmitted and received impulse like that in FIG. 3 will be used as an example. The basic impulse associated with the present invention preferably includes a gaussian waveform with a full width half maximum (FWHM) of approximately 1.2 nanoseconds and a 10-90 risetime of approximately 1.8 nanoseconds. Although the waveform of FIG. 3 is the basic impulse useful for practicing the present invention, a transmitted digital "1" according to the present invention preferably includes a sequence of at least three of these pulses sent at very precise time intervals.

Figure 4:
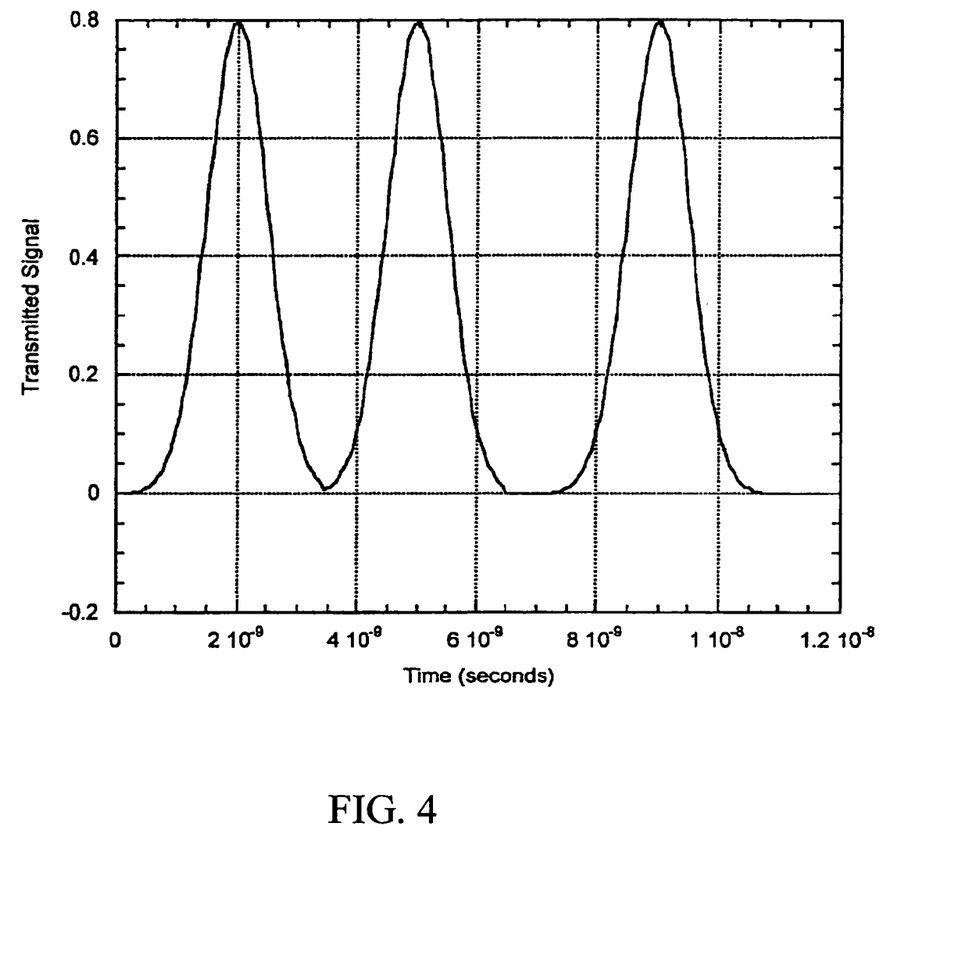
FIG. 4 is a waveform diagram of three pulses occurring within a predetermined time interval.

Referring now to FIG. 4, a sequence of three pulses occurring within a predetermined time interval or window is depicted. According to the present invention, the three pulses can occur anywhere within the time interval. In the specific example of FIG. 4, the second pulse follows the first pulse by three nanoseconds, with the third pulse occurring 7 nanoseconds after the first. A received signal can be time averaged if one knew how to trigger for the following digital 1's. In system of the present invention, however, there is no "regular" interval between the sequence of these three pulses. Preferably, the timing relationship between the pulses can be varied according to a predetermined code, thereby further enhancing the security of the signal. The pulses can come at anytime during a 100 nanosecond time interval (the time between successive digital 1's and 0's). With a system constructed in this fashion, data rates of 10 Mbits/sec are possible and no phase coherence between the transmitter and receiver is necessary.

Figure 5:
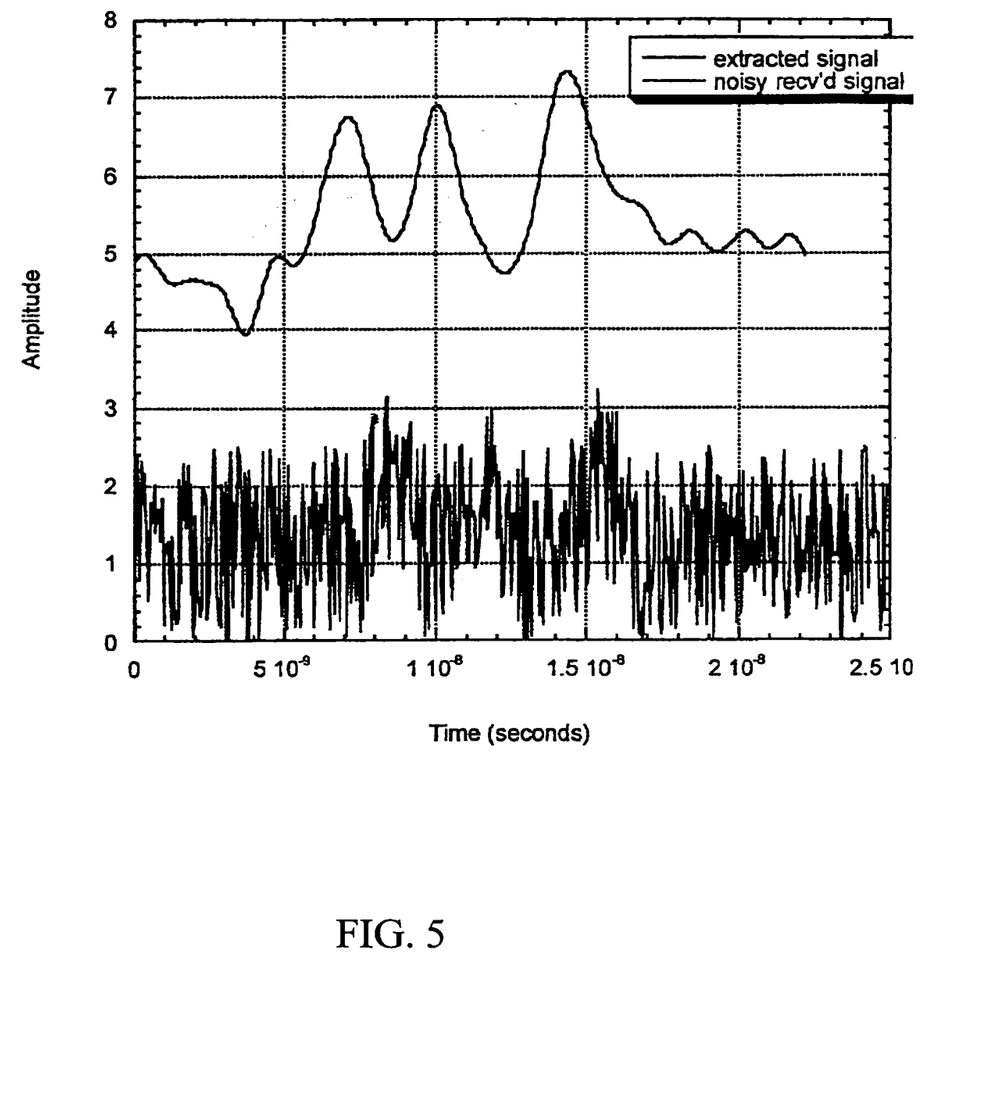
FIG. 5 is a waveform diagram of a signal extracted from a noisy received signal.

Referring now to FIG. 5, the technique for extracting the received signal from a noisy environment will be explained. This technique includes convolving the received signal with either a template (or kernal) of the known transmitted single pulse of FIG. 3 or the triplet of pulses of FIG. 4. In equation form, this takes the following form:

for $R(t)$=received signal $K(t)$=kernal for convolution (single pulse or triplet)

then $$f(t) = \int_{-\infty}^{\infty} K(t')R(t'-t)dt'$$

and $f(t)$=extracted signal

An example of this process is shown in FIG. 5. The baseline for the extracted signal has been amplitude-shifted so that the two signals can be compared in a linear graph; however, no further processing has been performed for the extraction. It should be noted that the received signal has noise peaks significantly higher that the embedded signal (~3.0 vs 0.8). This observation naturally leads to the question of how far can one extend this process.

Figure 6:
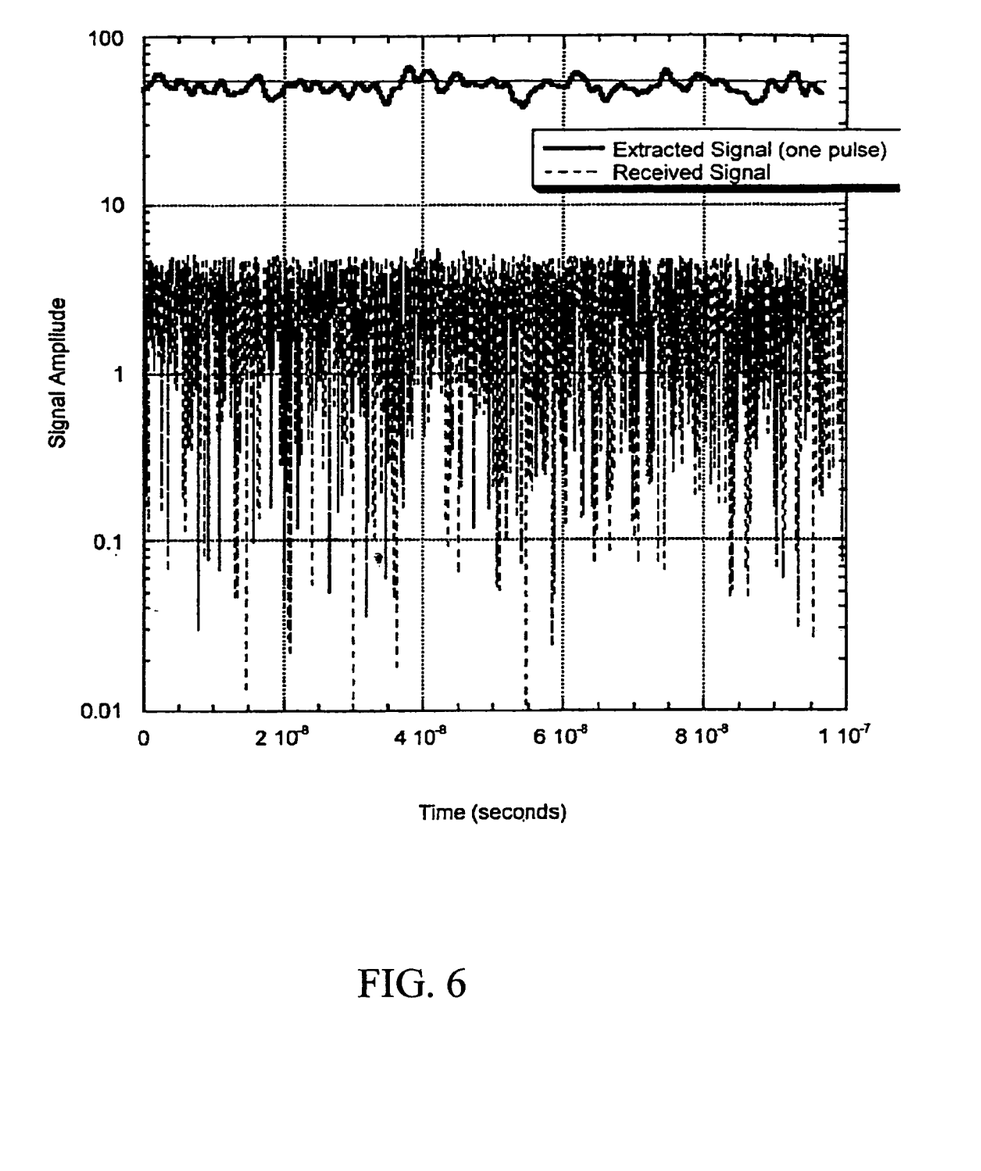
FIG. 6 is a waveform diagram of an extracted signal for a signal-to-noise ratio of −44.5 dB.

Referring now to FIG. 6, a waveform diagram shows the extraction of the transmitted signal using only the single pulse as a kernal in the convolution process. In FIG. 6, the signal-to-noise ratio for the transmitted signal compared to the gaussian noise is −44.5 dB. One can see that it is very difficult to discern that there is a signal in the received 100 nanosecond time sequence.

Figure 7:
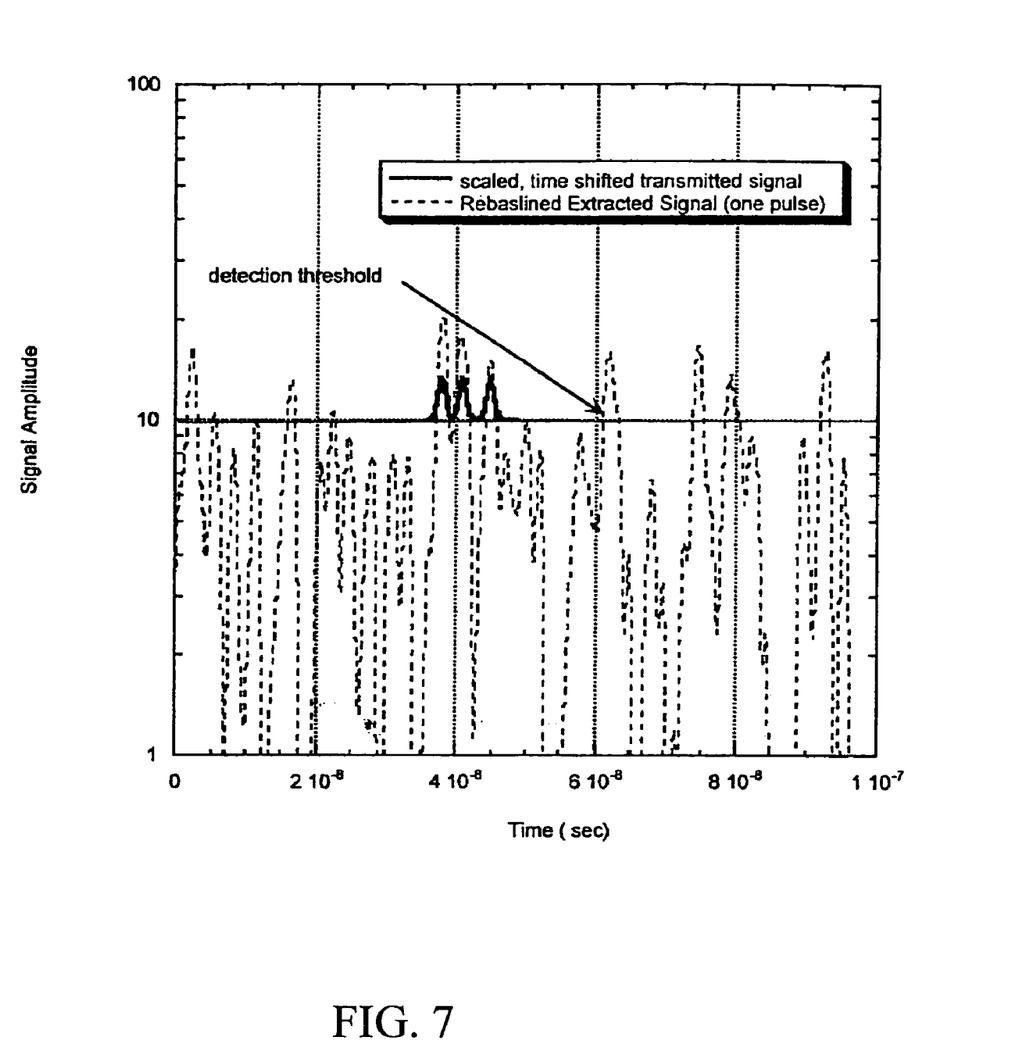
FIG. 7 is a waveform diagram of a detected signal for a signal-to-noise ratio of −44.5 dB.

Referring now to FIG. 7, a waveform diagram shows the extracted signal (using only one pulse) compared to a scaled a time-shifted version of the signal actually sent. For ease of comparison, a threshold for detecting has also been inserted for the extracted signal, with the notion that only pulses above this line would be examined. It should be noted that the triplet digital "1" only appears once in this 100 ns time sequence of FIG. 7.

Figure 8:
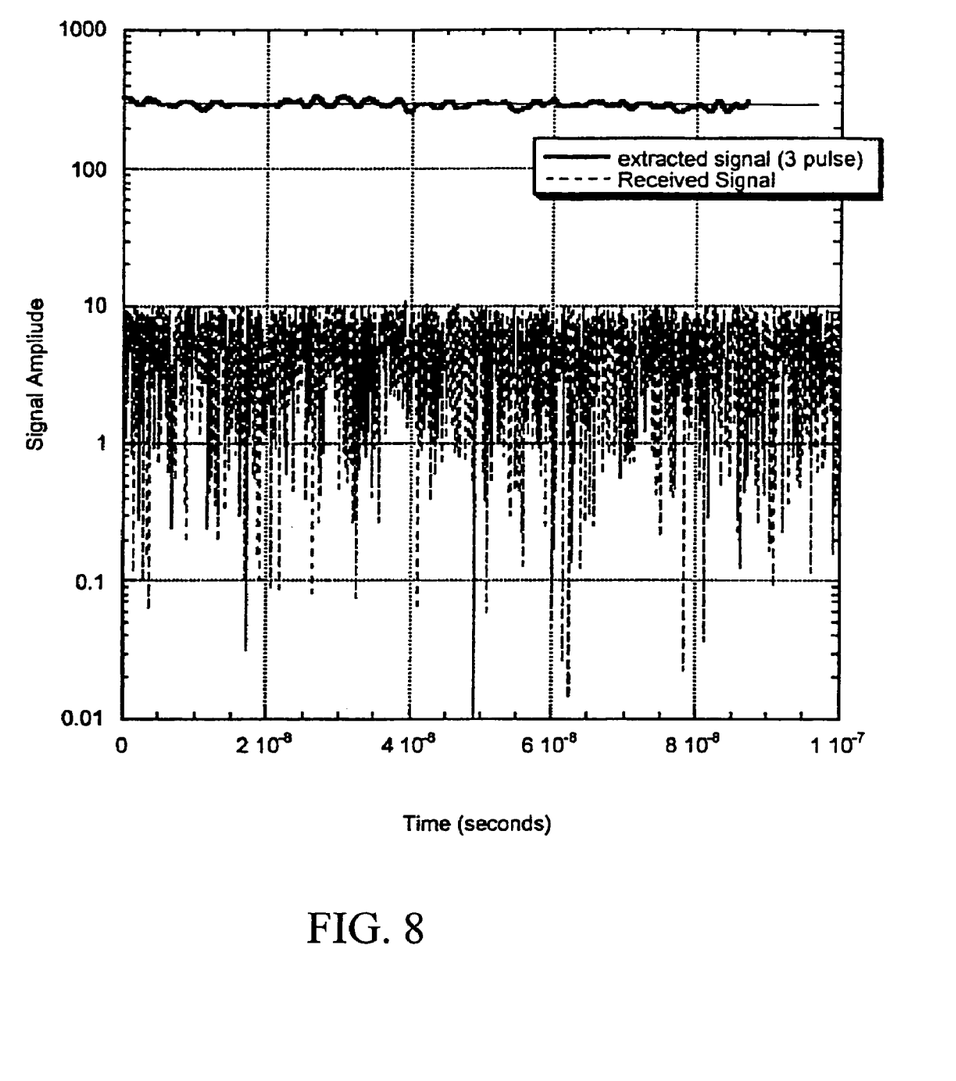
FIG. 8 is a waveform diagram of an extracted signal for a signal-to-noise ratio of −55.1 dB.
Figure 9:
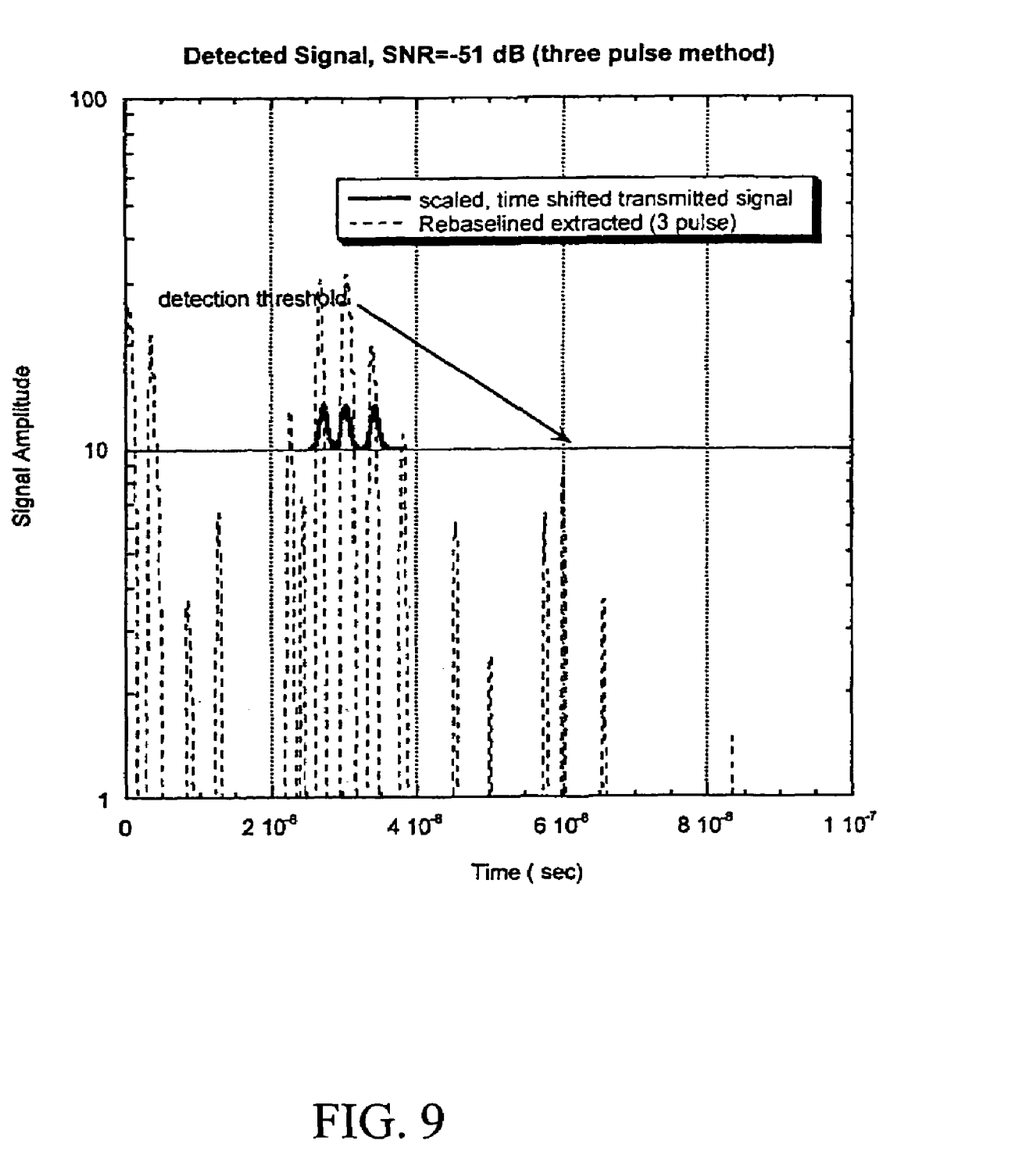
FIG. 9 is a waveform diagram of a detected signal for a signal-to-noise ratio of −51 dB.

One could also perform this convolution-extraction process using the triplet signal as the kernal. FIG. 8 shows the received versus the extracted signal for a SNR of −51 dB. A comparison of the extracted signal (using the triplet) to the sent pulse is shown in FIG. 6. It should be noted that one can find again the transmitted triplet in the extracted signal. In this case the average power of the noise is more than 5 orders of magnitude greater than the signal embedded in the received signal. The present invention clearly provides for the ability to extract a signal from a received signal subject to the influence of noise.

The above-described apparatus and method for extracting relatively small time domain impulsive signals is particularly well adapted for use in the transmission of secure ground-to-ground messages, secure aircraft-to-ground messages, or IFF data. The present invention, however, is not limited to secure communications systems.

It is, of course, possible to embody the invention in specific forms other than those described above without departing from the spirit of the invention. Thus, the embodiments described above are merely illustrative and should not be considered restrictive in any way. The scope of the invention is determined by the following claims, rather than the preceding description, and all variations and equivalents that fall within the scope of the claims are intended to be embraced therein.

What is claimed is:

1. A method for communicating with relatively small, time domain impulsive signals between at least first and second locations, comprising the steps of:
    generating a sequence of at least three pulses having a predetermined template anywhere within a series of predetermined time intervals at a first location, said predetermined time intervals having established beginning times and said pulses within each time interval having a known predetermined relationship with each other;
    transmitting the sequence of pulses within the predetermined time intervals from the first location;
    receiving the sequence of pulses within the predetermined intervals at the second location; and
    detecting the presence of the predetermined pulses by convolving the predetermined template with the received signal, wherein the predetermined template includes at least three pulses.

2. The method according to claim 1 which further includes the step of utilizing information from the detected pulses.

3. The method according to claim 1 used to generate and detect secure UWB or relatively small time domain impulsive communications signals.

4. A communications system based on relatively small, time domain impulsive signals between at least first and second locations, the communications system comprising:
    a pulse generator generating a sequence of at least three pulses having a predetermined template anywhere within a series of predetermined time intervals at a first location, said predetermined time intervals having established beginning times and said pulses within each time interval having a known predetermined relationship with each other;
    a transmitter transmitting the sequence of pulses within the predetermined time intervals from the first location;
    a receiver receiving the sequence of pulses within the predetermined intervals at the second location; and
    a detector detecting the presence of the predetermined pulses by convolving the predetermined template with the received signal, wherein the predetermined template includes at least three pulses.

5. The communications system according to claim 4 which utilizes information from the detected pulses for secure communications.

6. The communications system according to claim 4 wherein secure ground-to-ground messages, secure aircraft-to-ground messages, or IFF data are communicated.

* * * * *